(12) United States Patent
Monash

(10) Patent No.: US 7,437,902 B2
(45) Date of Patent: Oct. 21, 2008

(54) SYSTEM AND METHOD FOR DETERING THEFT OF MOTORIZED VEHICLES

(76) Inventor: Albert Monash, 6096 Huntwick Terr., Apt. 308, Delray Beach, FL (US) 33484-1851

( * ) Notice: Subject to any disclaimer, the term of this patent is extended or adjusted under 35 U.S.C. 154(b) by 0 days.

(21) Appl. No.: 11/764,784

(22) Filed: Jun. 18, 2007

(65) Prior Publication Data

US 2008/0028884 A1 Feb. 7, 2008

Related U.S. Application Data

(63) Continuation-in-part of application No. 11/364,666, filed on Aug. 4, 2006, now abandoned.

(51) Int. Cl.
*B60R 25/02* (2006.01)
(52) U.S. Cl. .............................. 70/182; 70/185; 70/186; 280/775
(58) Field of Classification Search ........... 70/182–185, 70/186, 252; 280/775
See application file for complete search history.

(56) References Cited

U.S. PATENT DOCUMENTS

| | | | | | |
|---|---|---|---|---|---|
| 903,476 | A | * | 11/1908 | Jansen | 70/185 |
| 1,020,930 | A | * | 3/1912 | Seeley | 70/182 |
| 1,332,075 | A | * | 2/1920 | Smith | 70/185 |
| 1,336,384 | A | * | 4/1920 | Smith | 70/182 |
| 1,342,728 | A | * | 6/1920 | Welch | 70/252 |
| 1,359,213 | A | * | 11/1920 | Welch | 70/183 |
| 1,359,433 | A | * | 11/1920 | Ritter | 70/182 |
| 1,375,386 | A | * | 4/1921 | Hale et al. | 70/185 |
| 1,408,652 | A | * | 3/1922 | Steinberg | 70/185 |
| 1,417,340 | A | * | 5/1922 | Litrem | 70/185 |
| 1,464,908 | A | * | 8/1923 | Kettering | 70/183 |
| 1,486,273 | A | * | 3/1924 | Allison | 70/312 |
| 1,554,815 | A | * | 9/1925 | Godshalk | 70/252 |
| 1,709,525 | A | * | 4/1929 | Dewey | 70/185 |
| 1,736,900 | A | * | 11/1929 | Carpenter | 70/185 |
| 1,956,438 | A | * | 4/1934 | Eichenauer | 70/183 |
| 2,118,394 | A | * | 5/1938 | Bullis | 70/451 |
| 2,687,030 | A | * | 8/1954 | Fontal | 70/184 |
| 2,747,396 | A | * | 5/1956 | Littleton | 70/185 |
| 2,868,007 | A | * | 1/1959 | Neiman et al. | 70/252 |
| 2,874,562 | A | * | 2/1959 | Cross | 70/252 |
| 2,890,581 | A | * | 6/1959 | Lewis | 70/248 |
| 3,570,286 | A | * | 3/1971 | Rohrbough | 70/181 |
| 3,863,472 | A | * | 2/1975 | Klingfus | 70/186 |
| 4,051,703 | A | * | 10/1977 | Plaiss | 70/371 |
| 4,934,737 | A | * | 6/1990 | Nakatsuka | 280/775 |

(Continued)

*Primary Examiner*—Lloyd A Gall
(74) *Attorney, Agent, or Firm*—Richard S. Finkelstein

(57) ABSTRACT

According to some embodiments, an apparatus is provided. The apparatus comprises a steering column, a steering post, and a locking mechanism. The steering post comprises a first opening and a second opening and the first opening parallel to the second opening. The steering post is contained within the steering column. The locking mechanism is coupled to the steering column and comprises a first member including a first diameter; and a second member including a second diameter. The first diameter is larger than the second diameter, and the second member is to telescopically extend from the first member. The second member is to substantially fit inside the first member when the second member is not extended, and the second member is to extend through both the first opening and the second opening.

10 Claims, 11 Drawing Sheets

U.S. PATENT DOCUMENTS

| | | | |
|---|---|---|---|
| 5,211,042 A * | 5/1993 | Watanuki | 70/252 |
| 6,076,381 A * | 6/2000 | Green | 70/186 |
| 6,161,403 A * | 12/2000 | Surratt | 70/34 |
| 6,237,376 B1 * | 5/2001 | Surratt | 70/34 |
| 7,000,441 B2 * | 2/2006 | Sutton et al. | 70/276 |
| 7,316,138 B2 * | 1/2008 | Goshima et al. | 70/186 |
| 2006/0272370 A1 * | 12/2006 | Yamada et al. | 70/186 |
| 2007/0084259 A1 * | 4/2007 | Bellamy et al. | 70/278.7 |

* cited by examiner

FIG. 9
900
```
Turn a steering wheel to line up a lock control of a locking mechanism with an
opening in a steering column
                                                                            901
```
```
Unlock the locking mechanism                                                902
```
```
Tilt a steering shaft to indicate that a motorized vehicle is not steerable
                                                                            903
```
```
Relock the locking mechanism to keep the steering shaft in a tilted position
                                                                            904
```

SYSTEM AND METHOD FOR DETERING THEFT OF MOTORIZED VEHICLES

CLAIM OF PRIORITY

This application is a continuation in part and claims priority to previously filed U.S. patent application Ser. No. 11/364,666 filed on Aug. 4, 2006, now abandoned, the contents of which are incorporated herein in their entirety for all purposes.

BACKGROUND

It is not an uncommon occurrence for a car, truck or other motorized vehicle to be stolen and a typical method of deterence used by automobile manufacturers is to provide an alarm system to prevent theft. However, it has become common place to hear car alarms going off without police being alerted or anyone paying attention to the car alarm.

Some manufacturers currently produce devices coupled to the steering wheel that are designed to lock the steering wheel but car thieves have been known to cut the steering wheel to remove these devices.

SUMMARY

In one embodiment an apparatus is provided. The apparatus comprises a steering column, a steering post, and a locking mechanism. The steering post comprises a first opening and a second opening and the first opening parallel to the second opening. The steering post is contained within the steering column. The locking mechanism is coupled to the steering column and comprises a first member including a first diameter; and a second member including a second diameter. The first diameter is larger than the second diameter, and the second member is to telescopically extend from the first member. The second member is to substantially fit inside the first member when the second member is not extended, and the second member is to extend through both the first opening and the second opening.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, descriptions, and claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 9 illustrates a method according to some embodiments.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Figure 1:
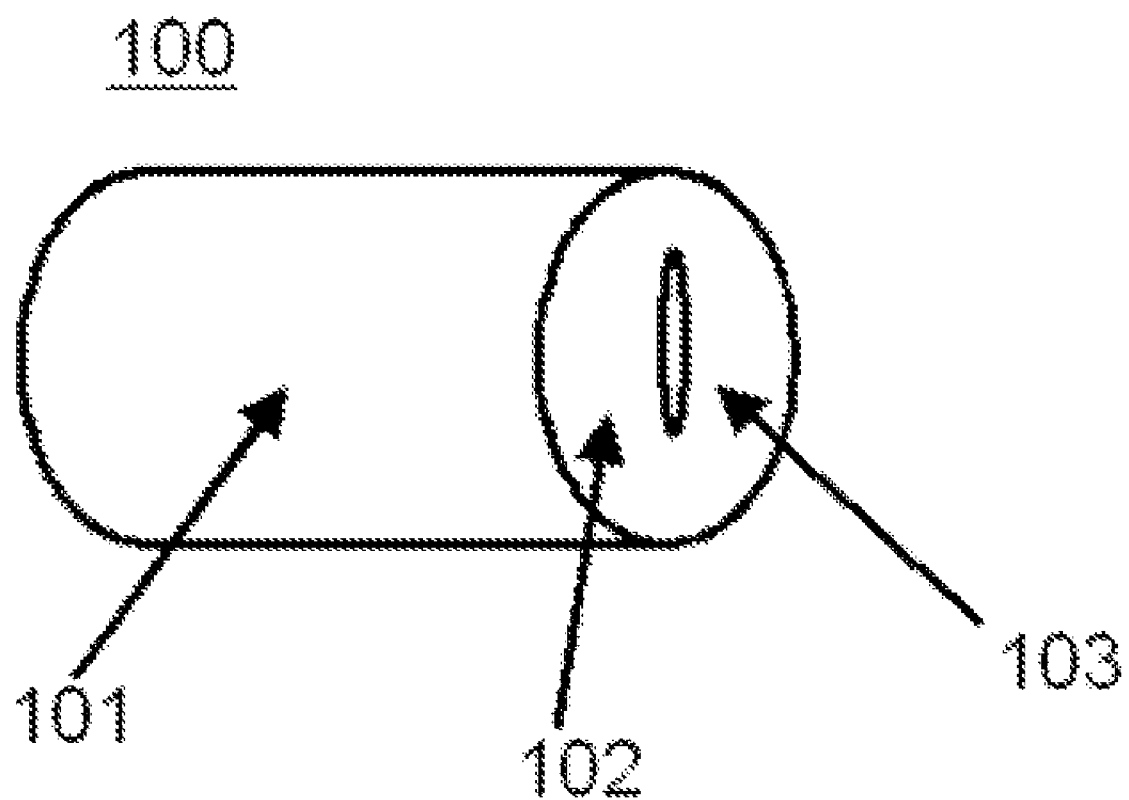
FIG. 1 illustrates a lock according to some embodiments.

Now referring to FIG. 1, an embodiment of a locking mechanism 100 in an unlocked position is illustrated. The locking mechanism 100 may comprise a first member 101, a second member (not shown), a face 102, and a key hole 103. The locking mechanism 100 may be comprised of any metal, or steel. In some embodiments, the locking mechanism 100 is comprised of titanium or tungsten carbide.

The locking mechanism 100 may comprise a first diameter that is large enough to house the second member. When the locking mechanism 100 is unlocked, the second member may be contained within the first member 101.

Figure 1A:
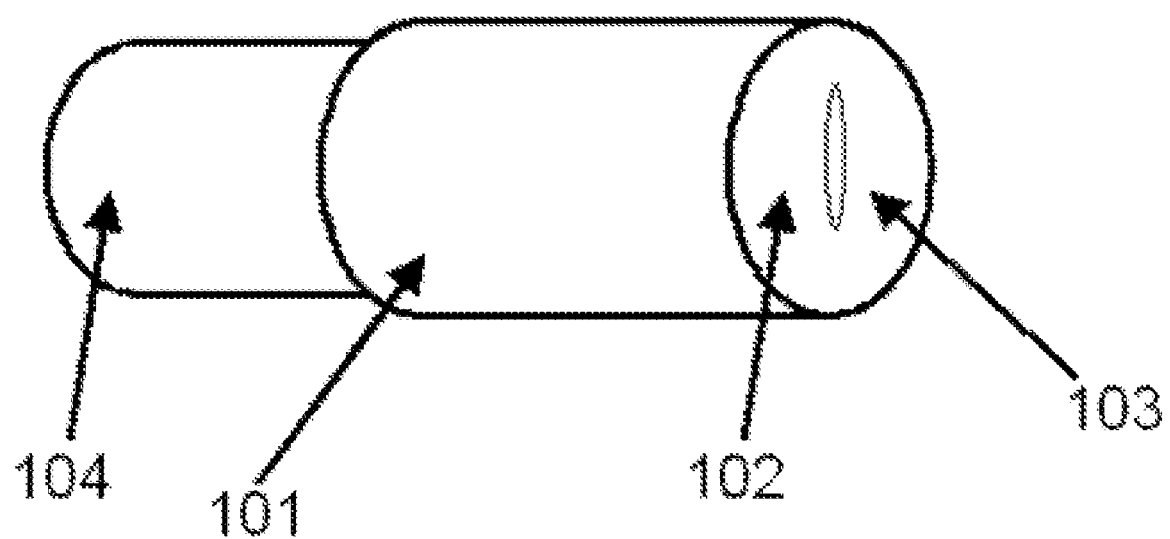
FIG. 1A illustrates a lock according to some embodiments.

Now referring to FIG. 1A, an embodiment of the locking mechanism 100 in a locked position is illustrated. When the locking mechanism 100 is locked, the second member 104 may extend from the first member 101 and in some embodiments, the second member 104 may telescopically extend from the first member 101. The second member 104 may comprise a second diameter that is small enough to be contained within the first member 101 when the locking mechanism 100 is unlocked.

Figure 2:
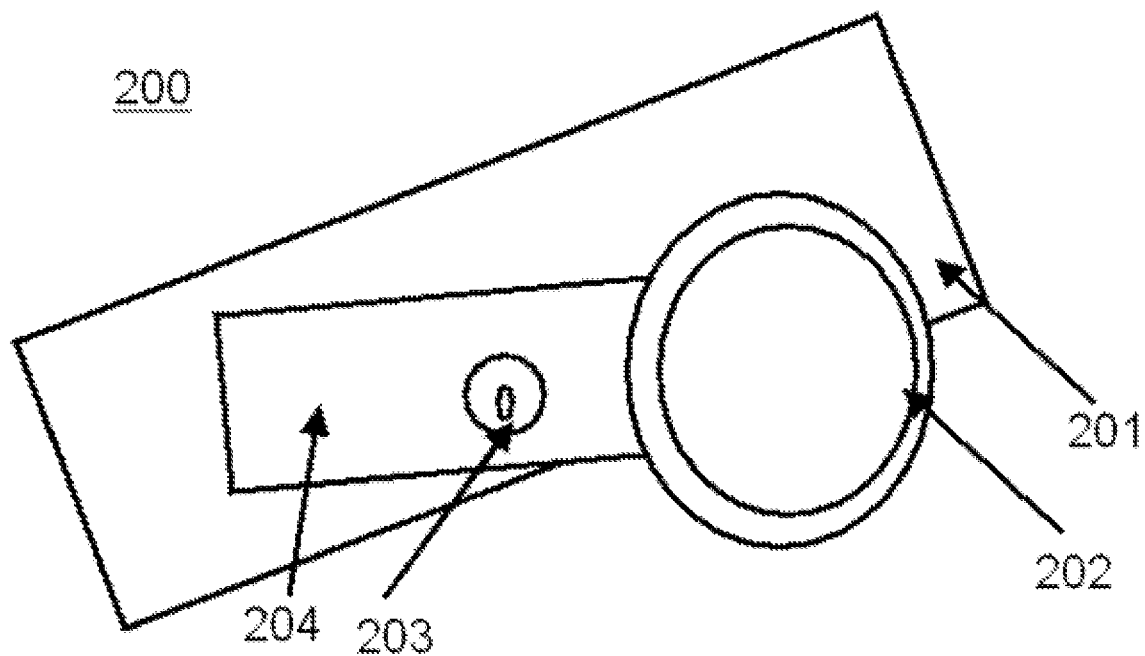
FIG. 2 illustrates an apparatus according to some embodiments.

FIG. 2 illustrates an embodiment of an apparatus 200. Apparatus 200 may comprise a dashboard 201, a steering wheel 202, a locking mechanism 203, and a steering column 204. The locking mechanism 203 may be as described with respect to FIG. 1 and FIG. 1A. The steering wheel 202 may comprise any item that may be used to steer a motorized vehicle. The dashboard 201 may be any dashboard (as known in the art) that may be used in a motor vehicle. The steering column 204 may couple the steering wheel 202 to the dashboard 201.

Figure 3:
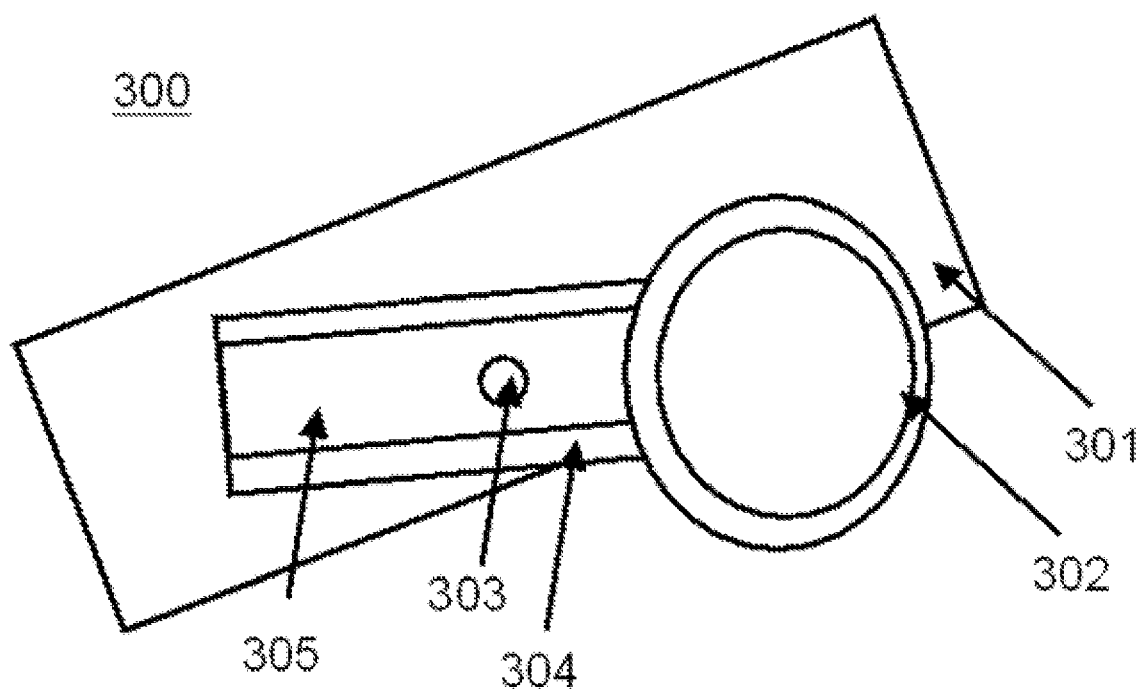
FIG. 3 illustrates an apparatus according to some embodiments.

Now referring to FIG. 3, an embodiment of an apparatus 300 is illustrated. The apparatus 300 may comprise a dashboard 301, a steering wheel 302, and a steering column 304 each as described with respect to FIG. 3. A steering post 305 may be contained within the steering column 304 and may be coupled to the steering wheel 302. The steering post 305 may comprise a first opening 303 and a second opening (not shown). The first opening 303 may be parallel to the second opening and the first opening may be a first size or diameter and the second opening may be a second size or diameter. In some embodiments, the first diameter may be greater than the second diameter.

Figure 4:
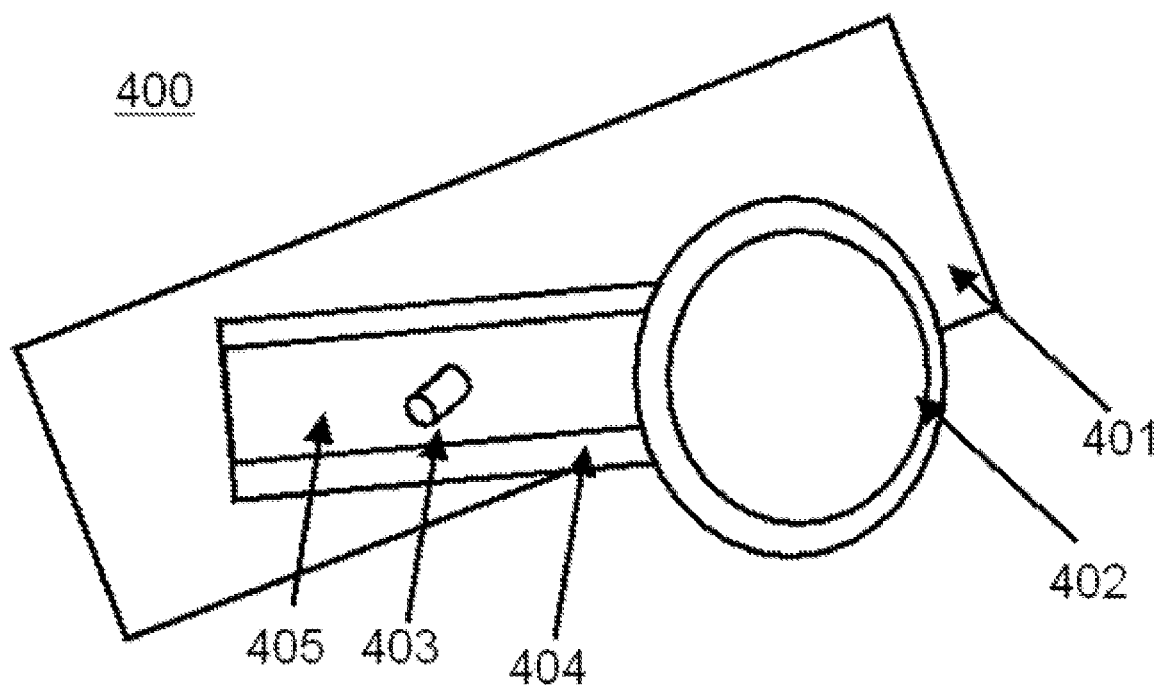
FIG. 4 illustrates an apparatus according to some embodiments.

An embodiment of an apparatus 400 is illustrated in FIG. 4. Apparatus 400 may comprise a dashboard 401, a steering wheel 402, a steering post 405, and a steering column 404 each as described with respect to FIG. 3 and FIG. 4. In some embodiments the locking mechanism 403 may be as described with respect to FIG. 1 and FIG. 1A.

Figure 5:
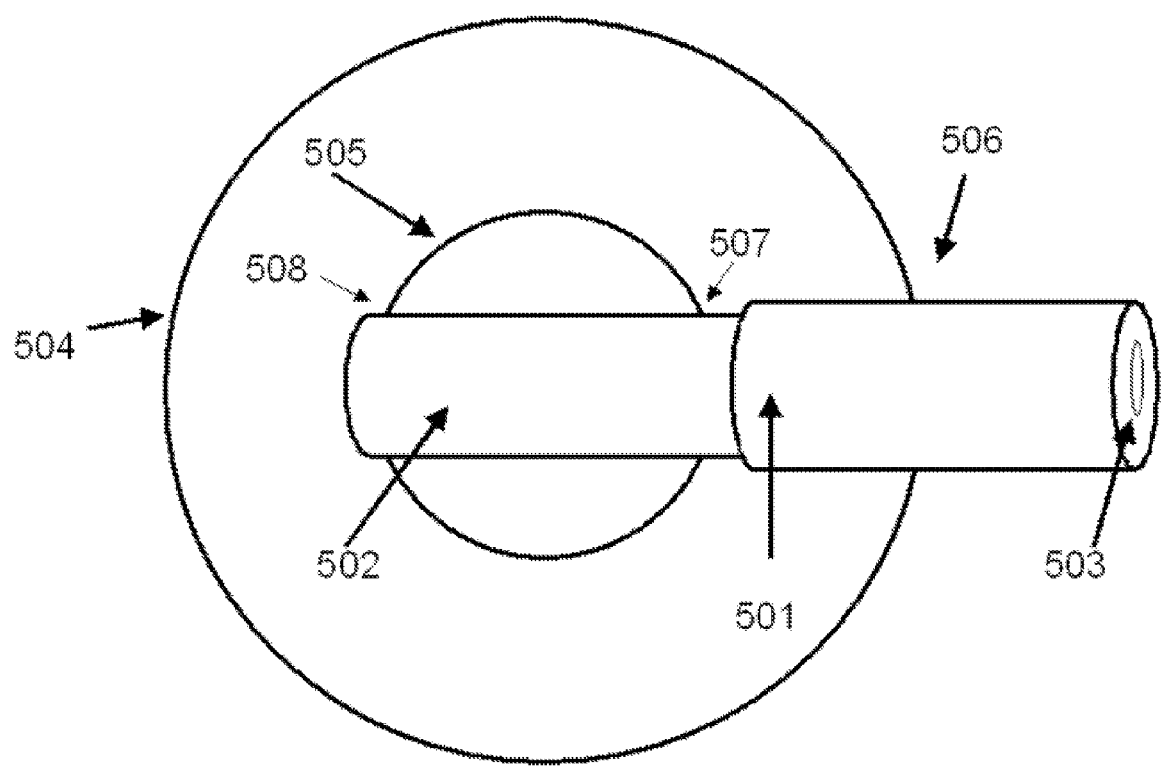
FIG. 5 illustrates an apparatus according to some embodiments.

FIG. 5 shows an embodiment of a cross section of a steering column 504 and a cross section of a steering shaft 505. The steering shaft 505 may comprise a first opening 507 and a second opening 508. In some embodiments the first opening 507 may have a greater diameter than the second opening 508. A locking mechanism 506 may be coupled to the steering column. The locking mechanism 506 may comprise a first member 501, a second member 502, and a face 503 comprising a key hole. The second member 502, as illustrated, may be telescopically extended from the first member 501 when the locking mechanism 506 is in a locked position. The first member 501 may be coupled to the steering column 504. In some embodiments, the face 503 may be substantially flush to the surface of the steering column 504.

Figure 6:
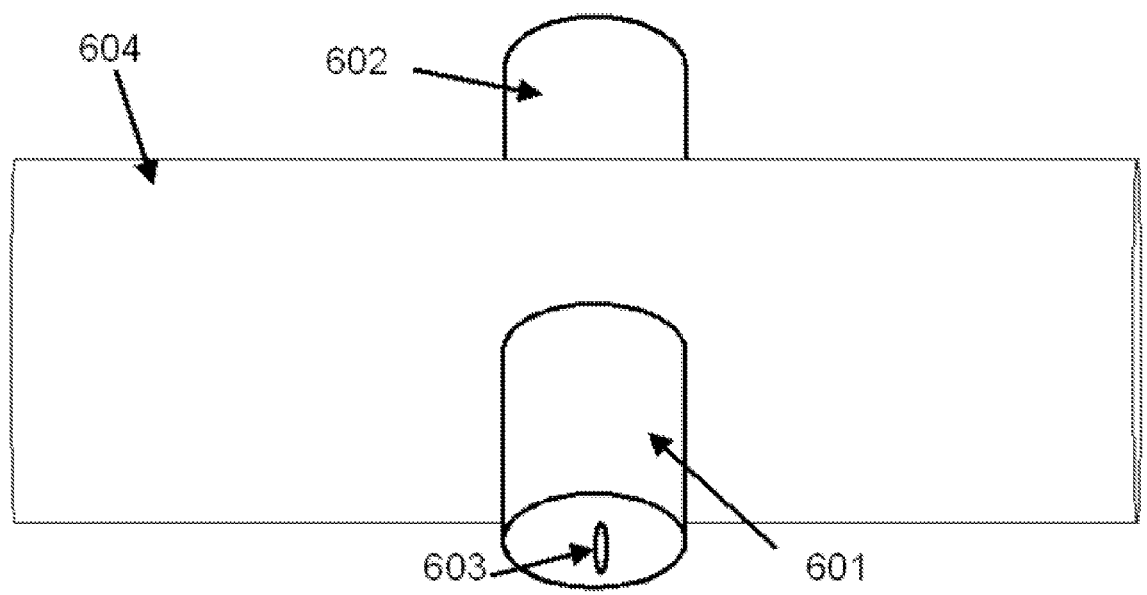
FIG. 6 illustrates an apparatus according to some embodiments.

An embodiment of a steering column 604 is illustrated in FIG. 6. A locking mechanism is illustrated intersecting the steering column 604, the locking mechanism comprising a first member 601, a second member 602, and a face comprising a key hole 603.

Figure 7:
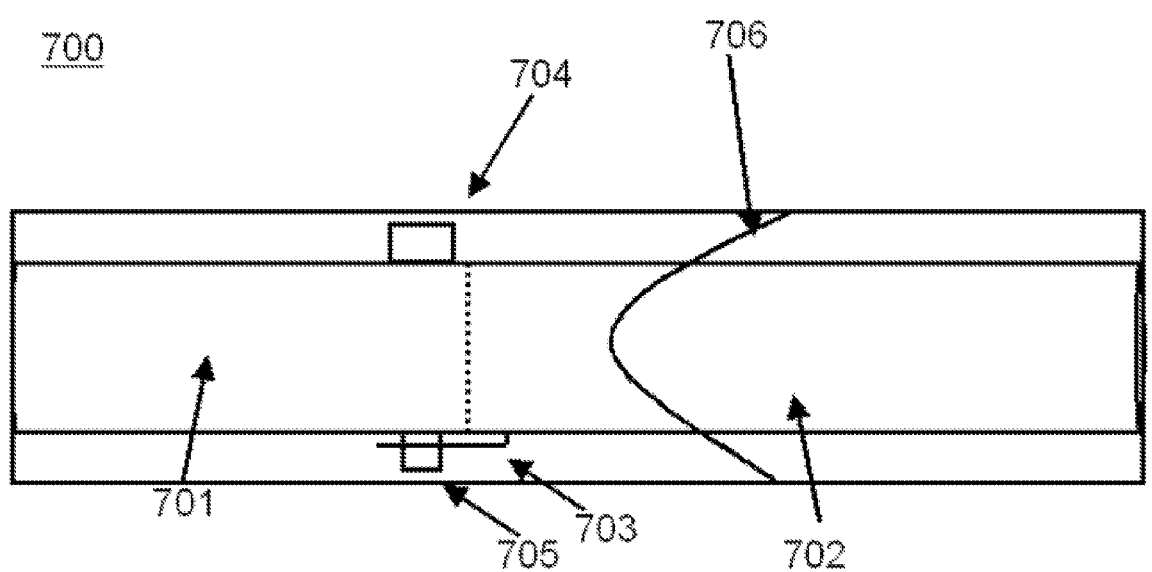
FIG. 7 illustrates an apparatus according to some embodiments.

In an alternative embodiment, a steering shaft may tilt when a steering shaft is in an unlocked position which may signal to prospective thieves that a motorized vehicle is substantially not steerable. As illustrated in FIG. 7, an apparatus 700 may comprise a steering shaft having a first shaft portion 701 and a second shaft portion 702 where each portion may be at least partially enclosed in a steering column 704. A locking mechanism 705, as previously described with respect to FIG. 1 and FIG. 1A, may be in a locked position when the steering shaft 701/702 is to turn. The locking mechanism 705 maybe totally enclosed in the steering column such that the steering shaft 701/702 may have to be in a specific position to access a key hole (not shown) through an opening in the steering column 704. The locking mechanism 705 may also be coupled to a shaft latch 703 to couple the first shaft portion 701 to the second shaft portion 702. The shaft latch 703 may be coupled to both the locking mechanism 705 and the second portion 702.

When the locking mechanism 705 is in an unlocked position, the second shaft portion 702 may tilt downward through column opening 706 which may illustrate that a motorized vehicle is substantially not steerable.

Figure 8:
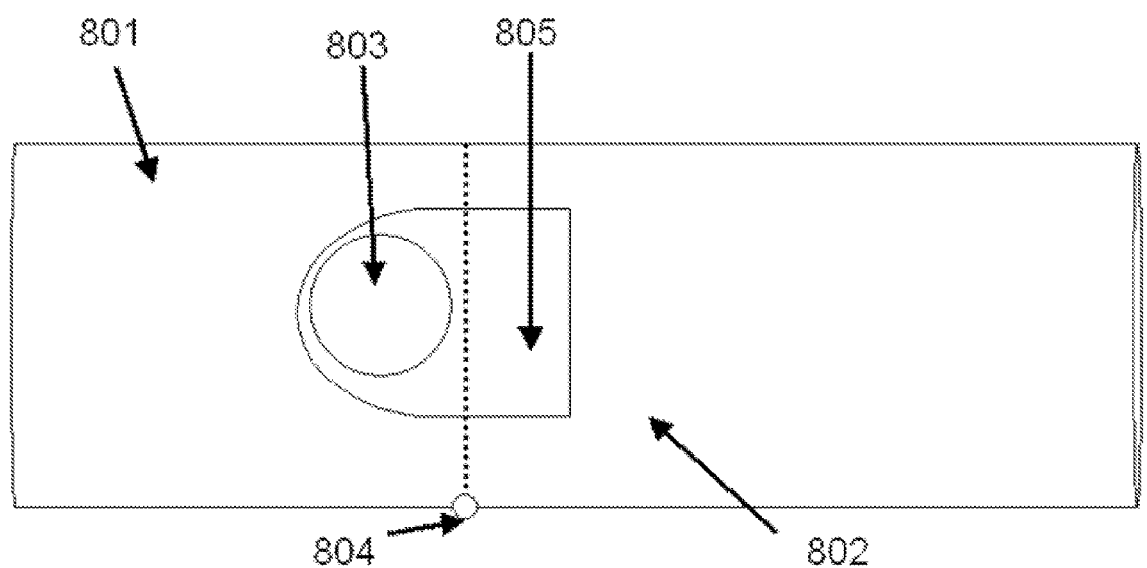
FIG. 8 illustrates an apparatus according to some embodiments.
Figure 8A:
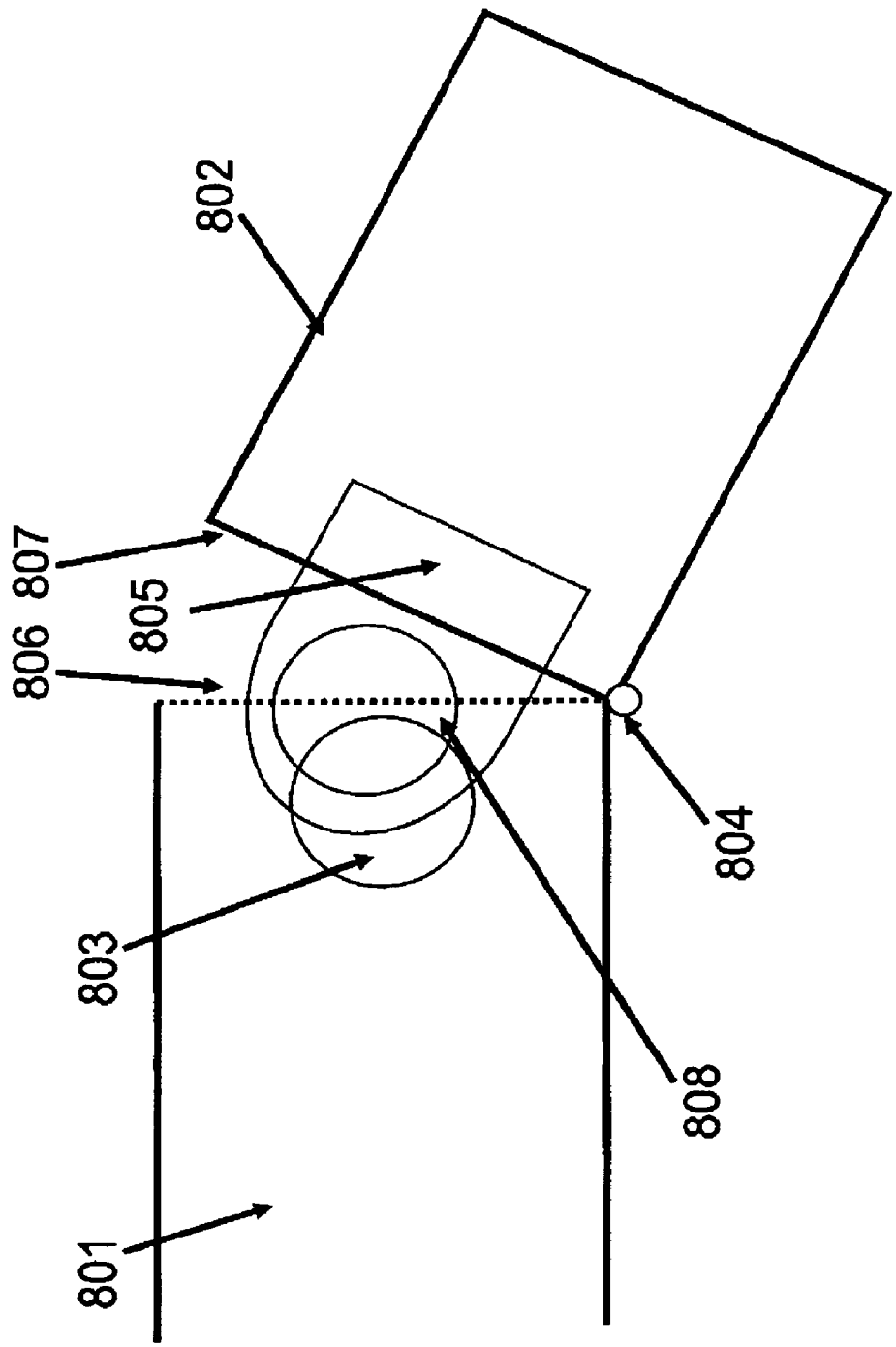
FIG. 8A illustrates an apparatus according to some embodiments.

Now referring to FIG. 8 and FIG. 8A, an embodiment of an apparatus 800 is illustrated. In some embodiments, FIG. 8 and FIG. 8A illustrate a side view of a steering shaft having a first shaft portion 801 and a second shaft portion 802. A shaft latch 805 is coupled to the second portion and the shaft latch 805 has a latch opening. The latch opening 808 may be lined up with a corresponding shaft opening 803 in the steering shaft 801/802. A hinge 804 may couple the first portion 801 to the second portion 802. When a locking mechanism (not shown) is in an unlocked position, the second portion 802 may tilt around hinge 804 as illustrated in FIG. 8A. In some embodiments, the binge 804 may comprise a cut-off switch, such that when the switch is open a motorized vehicle may not be able to start. When the locking mechanism, such as locking mechanism 705, is in a locked position, a circumference sized surface area of the first shaft portion 806 is in contact with a circumference sized surface area of the second shaft portion 807 and a latch opening 808 is aligned with a second opening 803 of the steering shaft. As illustrated in FIG. 8, a diameter of the circumference sized surface area of first post portion 806 is equal to a diameter of the circumference sized surface area of second post portion 807. If the locking mechanism 705 is in an unlocked position, the circumference sized surface area of the first post portion 806 is not in contact with the circumference sized surface area of the second post portion 807 and the shaft latch opening 808 is not aligned with the second opening 803.

An embodiment of a method 900 is illustrated in FIG. 9. At 901 a steering wheel is turned until a lock control of a locking mechanism is lined up with an opening in a steering column. In some embodiments, the lock control may be key hole that requires an insertion of a key and in some embodiments, the lock control may be a combination mechanism such as a combination lock. The locking mechanism may be that as described with respect to FIG. 1 and FIG. 1A and the locking mechanism may be contained within the steering column. When the steering post is rotated, the locking mechanism may rotate within the steering column. The steering column may comprise an opening such that when the steering post is in a set position, the lock control may be accessed.

Next, at 902, the locking mechanism is unlocked. The locking mechanism may be unlocked via the lock control. In some embodiments, a key may be placed into the lock control and turned such that the locking mechanism unlocks. In some embodiments, a combination mechanism may be adjusted to display a code comprising a series of numbers or letters. If the displayed code matches an internal preset code then the locking mechanism may be unlocked. In some embodiments, the combination mechanism may be a mechanical combination lock. In some embodiments the combination lock may be coupled to a power supply and the combination mechanism may be an electrical lock where a code is entered via a series of electronic keys and/or switches. In some embodiments, the code may be entered by a remote control mechanism that transmits an electronic code to the lock mechanism.

At 903 a steering shaft is tilted to indicate that a motorized vehicle is not steerable. When the locking mechanism is unlocked, a portion of the steering shaft may tilt such as illustrated in FIG. 8A. In some embodiments, when the steering shaft is tilted, a cut-off switch may be opened such that a motorized vehicle may not be started or run. The cut-off switch may either create a ground or may prevent a starter motor from receiving power.

At 904 the locking mechanism is relocked to keep the steering shaft in a tilted position. By relocking the locking mechanism, the steering shaft may not be able to be returned to a position in which the motorized vehicle may be driven and/or started. In some embodiments by keeping the locking mechanism in a locked position may prevent the cutoff switch from being closed.

The foregoing has been described with reference to specific embodiments. It will, however, be evident that various modifications and changes may be made thereto without departing from the broader spirit and scope set forth in the appended claims.

What is claimed is:

1. An apparatus comprising:
   a steering column;
   a hinge;
   a steering post comprising a first opening and a second opening, the first opening parallel to the second opening, wherein the steering post is contained within the steering column, and wherein the steering post comprises a first post portion and a second post portion coupled by the hinge;
   a shaft latch coupled to the steering post, the shaft latch comprising a latch opening; and
   a locking mechanism coupled to the steering post and comprising:
      a first member comprising a first diameter; and
      a second member comprising a second diameter, wherein the first diameter is larger than the second diameter, wherein the second member is to telescopically extend from the first member, wherein the second member is to substantially fit inside the first member when the second member is not extended, and wherein the second member is to extend through the second opening and the latch opening, wherein the first member is coupled to the first opening, wherein if the locking mechanism is in a locked position a circumference sized surface area of the first post portion is in contact with a circumference sized surface area of the second post portion and the latch opening is aligned with the second opening, wherein a diameter of the circumference sized surface area of first post portion is equal to a diameter of the circumference sized surface area of second post portion, and wherein if the locking mechanism is in an unlocked position the circumference sized surface area of the first post portion is not in contact with the circumference sized surface area of the second post portion and the shaft latch opening is not aligned with the second opening.

2. The apparatus of claim 1, wherein the locking mechanism further comprises:

a keyhole.

3. The apparatus of claim 1, further comprising a dashboard, wherein the steering post extends into a portion of the dashboard, and wherein the shaft latch further comprises a first segment and a second segment comprising the latch opening, wherein the first segment is coupled at a right angle to the second post portion, wherein a first end of the second segment is coupled at a right angle to the first segment, and wherein a second end of the second segment is curved.

4. The apparatus of claim 1, further comprising:

a steering wheel, wherein the steering wheel is to turn when the locking mechanism is in an locked position and wherein the steering wheel can not turn when the locking mechanism is in a unlocked position.

5. The apparatus of claim 1, wherein the locking mechanism is comprised of titanium.

6. The apparatus of claim 1, wherein the locking mechanism is comprised of tungsten carbide.

7. A method comprising:

turning a steering wheel to turn a steering post to line up a lock control of a locking mechanism with an opening in a steering column, wherein the steering post comprises a first post portion coupled to a second post portion by a hinge, wherein the locking mechanism is coupled to the steering post and comprises a first member that comprises a first diameter, and a second member that comprises a second diameter, wherein the first diameter is larger than the second diameter, wherein the second member is to telescopically extend from the first member, wherein the second member is to substantially fit inside the first member when the second member is not extended, wherein the second member is to extend through a second opening of the steering post and a latch opening of a shaft latch that is coupled to the steering post, wherein the first member is coupled to a first opening of the steering post, and wherein when the looking mechanism is in a locked position a circumference sized surface area of the first past portion is in contact with a circumference sized surface area of the second post portion and the latch opening is aligned with the second opening;

unlocking the locking mechanism;

tilting a portion of the steering post to indicate that a motorized vehicle is undriveable, wherein when the locking mechanism is in an unlocked position a circumference sized surface area of a first post portion is not in contact with a circumference sized surface area of a second post portion and a shaft latch opening is not aligned with the second opening; and relocking the locking mechanism to keep the portion of the steering post in a tilted position by preventing the latch opening from being aligned with the second opening.

8. The method of claim 7 further comprising:

inserting a key into a key hole; and turning the key until the locking mechanism is unlocked.

9. The method of claim 7, wherein the locking mechanism is comprised of titanium.

10. The method of claim 7, wherein the locking mechanism is comprised of tungsten carbide.

* * * * *